United States Patent [19]

Ou

[11] 4,404,982
[45] Sep. 20, 1983

[54] RUPTURABLE PRESSURE RELIEF APPARATUS

[75] Inventor: Sam A. Ou, Bixby, Okla.

[73] Assignee: BS&B Safety Systems, Ltd., Limerick, Ireland

[21] Appl. No.: 347,472

[22] Filed: Feb. 10, 1982

[51] Int. Cl.³ ............................................. F16K 13/04
[52] U.S. Cl. .................................. 137/68 R; 137/71; 220/89 A
[58] Field of Search ............ 137/68 R, 71; 220/89 A, 220/207

[56] References Cited

U.S. PATENT DOCUMENTS 3,526,336 9/1970 Wood ............................... 220/89 A

FOREIGN PATENT DOCUMENTS 957849 2/1950 France ............................... 137/68 R Primary Examiner—Harold W. Weakley
Attorney, Agent, or Firm—C. Clark Dougherty, Jr.

[57] ABSTRACT

A rupturable pressure relief apparatus which is non-fragmenting and which is particularly suitable for liquid and low pressure gas service. The apparatus includes an annular rupture disk having an annular flange portion connected to a concave-convex portion by a circular transition connection. The concave-convex portion includes a groove in a side thereof creating a substantially circular line of weakness therein and at least one concave-convex hinge reinforcing member is attached to a side of the concave-convex portion of the rupture disk. The hinge reinforcing member is positioned and is of a shape whereby upon rupture of the rupture disk, the concave-convex portion tears along the line of weakness created by the groove and bends about an integral untorn portion corresponding with the hinge reinforcing member.

14 Claims, 8 Drawing Figures

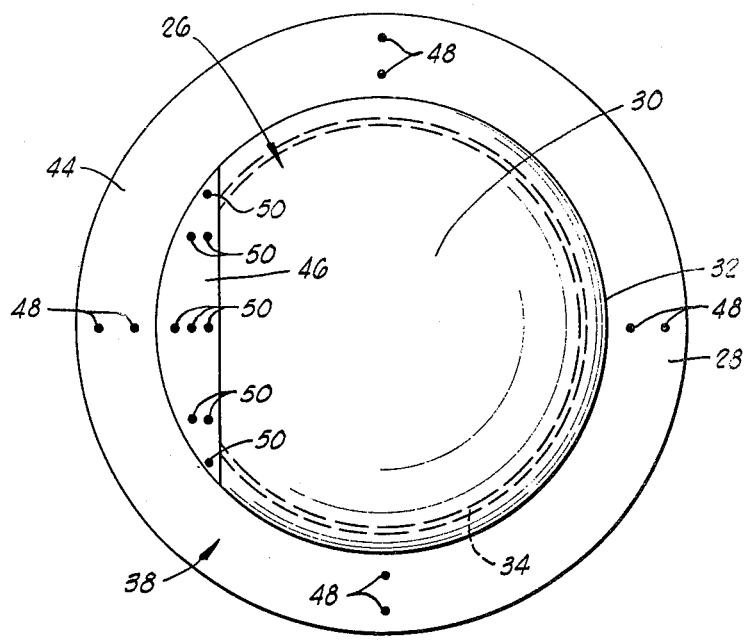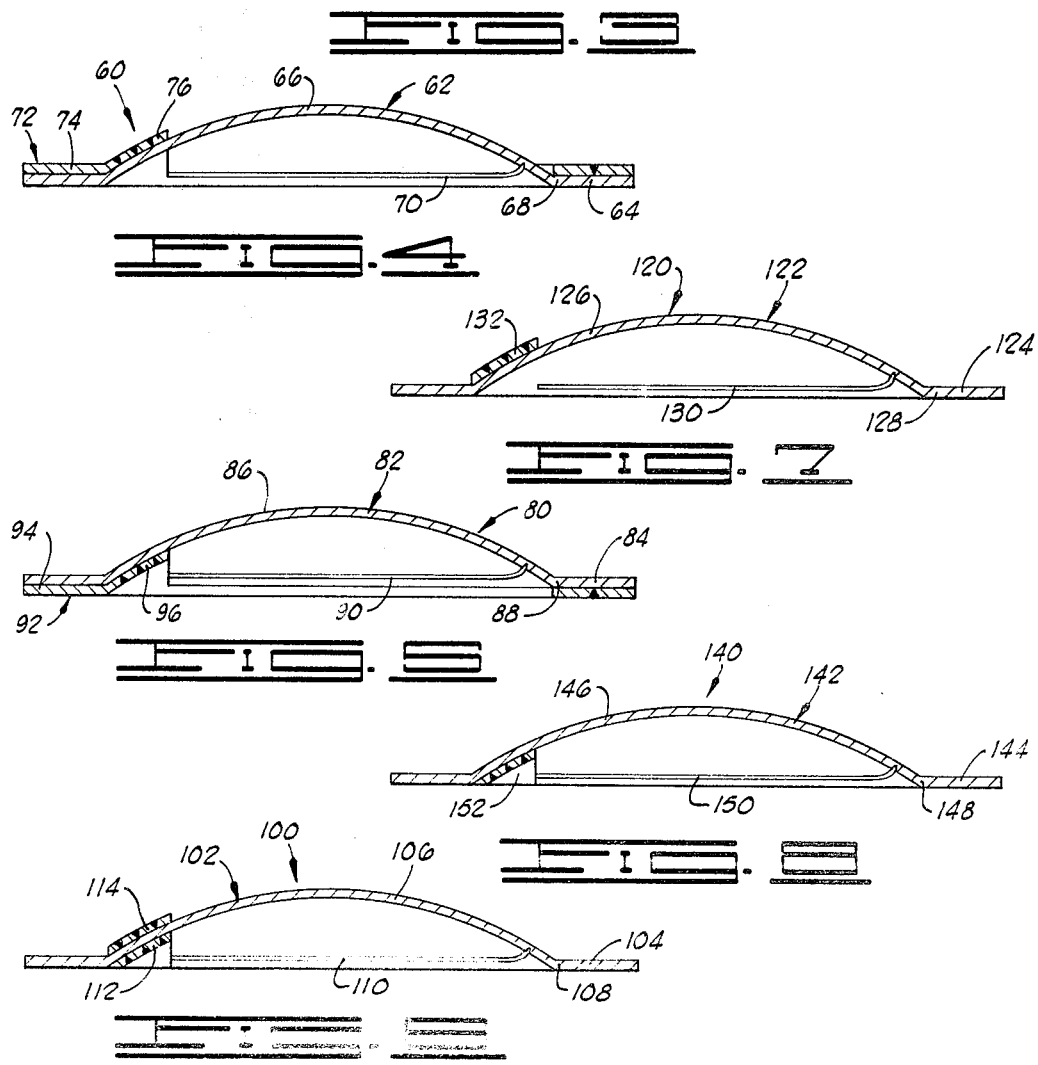

RUPTURABLE PRESSURE RELIEF APPARATUS

BACKGROUND OF THE INVENTION

1. Field of the Invention

The present invention relates to rupturable pressure relief apparatus, and more particularly, but not by way of limitation, to a rupturable pressure relief apparatus of the type including at least one circular rupture disk supported between annular support members.

2. Description of the Prior Art

A great variety of rupturable pressure relief apparatus have been developed and used heretofore. Generally, such apparatus include a rupture disk clamped between inlet and outlet support members which are connected into a pressure relief system or area. When an overpressure condition exists in the system, the rupture disk ruptures and relieves pressurized fluids from the system through the apparatus.

The rupture disks which have been utilized have taken various forms and have included one or more parts. For example, flat rupture disks, rupture disks including concave-convex central portions and composites of such disks and other parts such as vacuum supports, support members, cutting members, etc., have all been utilized. Rupture disks with concave-convex central portions wherein the concave sides of the disks are exposed to fluids under pressure are commonly known as "conventional" rupture disks. Conventional rupture disks are placed in tension by the force of the fluids under pressure exerted thereon and rupture occurs when the tensile strength of the disk material is exceeded. Rupture disks including concave-convex central portions wherein the convex sides of the disks are exposed to fluid pressure are known as "reverse buckling" disks. Reverse buckling disks are placed in compression by the fluid pressure and upon rupture, the concave-convex portion first reverses itself and then ruptures.

Knife blades have been utilized with reverse buckling rupture disks to sever the disks upon reversal and bring about the full opening thereof without fragmentation, and scores or grooves have been utilized in both conventional and reverse buckling rupture disks to create lines of weakness therein whereby upon rupture the disks tear along the lines of weakness and fragmentation of the disks is prevented or substantially reduced.

While the various rupture disks and rupturable pressure relief apparatus developed heretofore have been used successfully in a variety of applications, in liquid service and in low pressure gas service problems have been encountered. More specifically, when conventional disks are utilized in such service which do not include scores or grooves creating lines of weakness therein, loose pieces are often formed upon rupture which can cause damage to or the malfunction of downstream apparatus. When conventional rupture disks having scores on a surface thereof or reverse buckling rupture disks including scores on a surface thereof or including knife blades for severing the disk are utilized in such service, fragmentation upon rupture of the disks is reduced, but often after initial rupture there is insufficient force exerted on the disk to open the disk fully.

By the present invention rupturable pressure relief apparatus which are non-fragmenting and which are particularly suitable for liquid and low pressure gas service are provided.

SUMMARY OF THE INVENTION

A rupturable pressure relief apparatus adapted to be clamped between inlet and outlet annular support members comprising a rupture disk having an annular flange portion connected to a concave-convex portion by a circular transition connection, the concave-convex portion including a groove in a side thereof creating a line of weakness therein. At least one concave-convex hinge reinforcing member is attached to a side of the concave-convex portion of the rupture disk having a shape and positioned adjacent a portion of the concave-convex portion of the rupture disk whereby upon rupture, the concave-convex portion of the rupture disk tears along the line of weakness created by the groove and bends about an integral untorn portion corresponding with the hinge reinforcing member.

It is, therefore, a general object of the present invention to provide an improved rupturable pressure relief apparatus.

A further object of the present invention is the provision of a rupturable pressure relief apparatus which is particularly suitable for use in liquid and low pressure gas service in that upon rupture the apparatus achieves full opening without fragmentation or loose pieces being formed.

Other objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3 is a top plan view of the rupture disk assembly of the apparatus of FIG. 1.

FIG. 4 is a side cross-sectional view of an alternate form of the rupture disk assembly of the present invention.

FIG. 5 is a side cross-sectional view of another alternate form of the rupture disk assembly of the present invention.

FIG. 6 is a side cross-sectional view of yet another form of the rupture disk assembly of the present invention.

FIG. 7 is a side cross-sectional view of a further alternate form of the rupture disk assembly of the present invention.

FIG. 8 is a side cross-sectional view of still another alternate form of the rupture disk assembly of the present invention.

DESCRIPTION OF THE PREFERRED EMBODIMENTS

Figure 1:
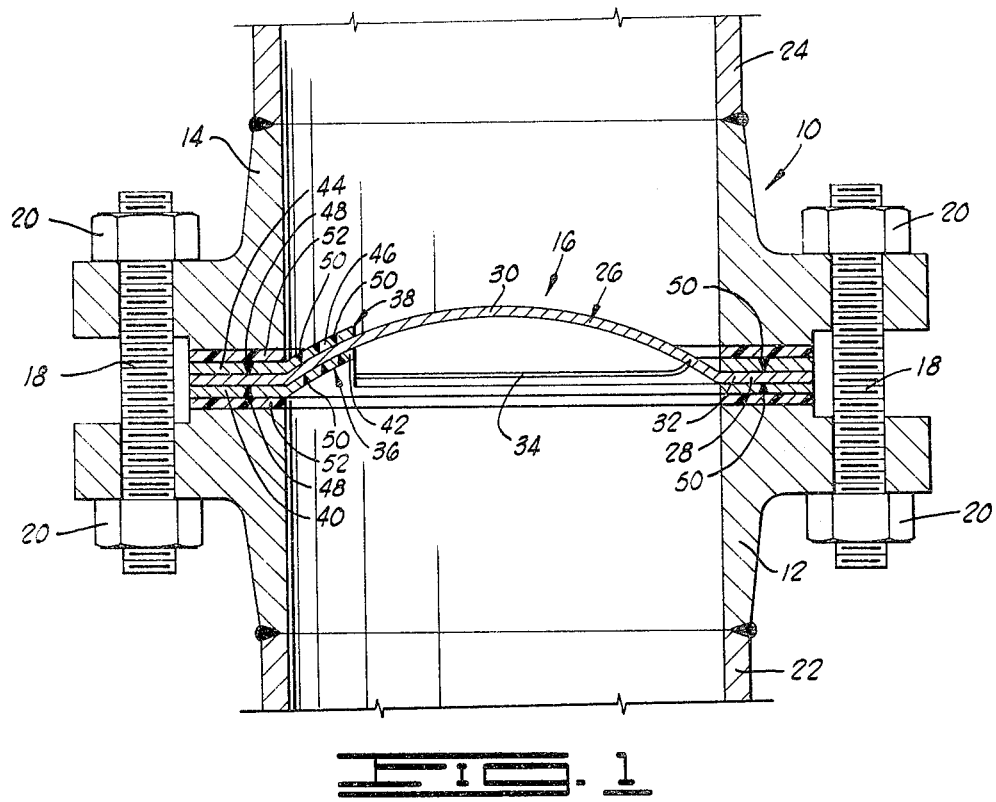
FIG. 1 is a side cross-sectional view of the rupturable pressure relief apparatus of the present invention connected to a pair of conduits which form a pressure relief area.
Figure 2:
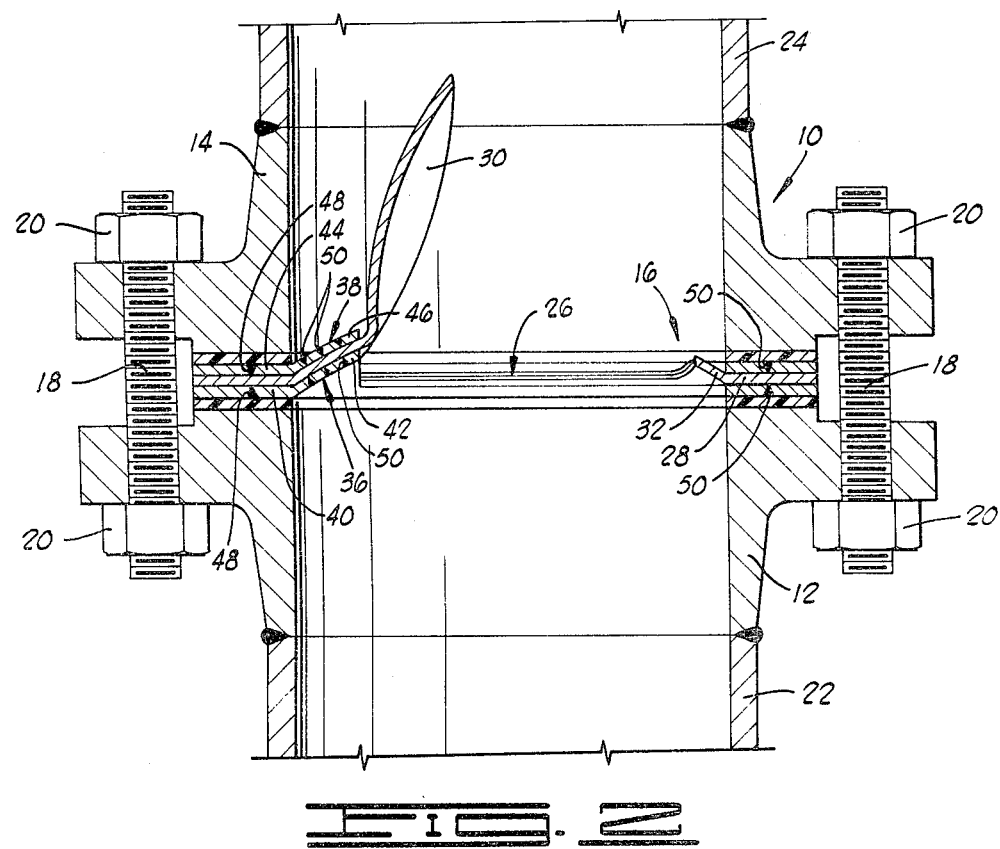
FIG. 2 is a side cross-sectional view of the apparatus of FIG. 1 after rupture of the rupture disk assembly thereof.

Referring now to the drawings, and particularly to FIGS. 1-3, the apparatus of the present invention is generally illustrated and designated by the numeral 10. The apparatus 10 is comprised of an inlet support member 12 and an outlet support member 14 having a rupture disk assembly, generally designated by the numeral 16 sealingly clamped therebetween. As will be understood by those skilled in the art, the inlet and outlet support members 12 and 14 can take various forms, and as shown in the drawings, can take the form of flanges which are sealingly clamped together with the rupture disk assembly 16 therebetween by a plurality of studs 18 and nuts 20. The support members 12 and 14 can take other forms such as annular support members which are in turn clamped between conventional pipe flanges or other clamping means.

The inlet support member 12 is sealingly connected to a conduit 22 such as by welding. The conduit 22 is in turn connected to a vessel or system (not shown) containing fluids under pressure which is to be protected by the apparatus 10 from reaching an overpressure condition. The outlet support member 14 is connected to a conduit 24 which leads pressurized fluids relieved through the apparatus 10 to another pressure relief device, such as a relief valve, to the atmosphere or to a point of storage, etc. The support members 12 and 14, in whatever form they take, include opposite complementary flat annular seating surfaces for sealingly engaging flat annular surfaces of the rupture disk assembly 16.

The rupture disk assembly 16 is comprised of a rupture disk 26 having an annular flat flange portion 28 connected to a concave-convex portion 30 by a circular transition connection 32. The rupture disk 26 is a conventional disk, i.e., the fluids under pressure are communicated thereto by way of the conduit 32 and the inlet support member 12 and exert force on the concave side of the rupture disk 26.

As best shown in FIG. 3, the concave-convex portion 30 of the rupture disk 26 includes a score or groove 34 formed in a side thereof, preferably in the concave side thereof. As is well understood by those skilled in the art, the groove 34 forms a line of weakness in the concave-convex portion 30 of the rupture disk 26 whereby when the design rupture pressure of the rupture disk 26 is reached or exceeded by the pressurized fluids exerted thereon, the concave-convex portion 30 tears along the line of weakness and opens. The groove 34 defines a substantially circular line of weakness in the concave-convex portion 30 of the rupture disk 26 and can be continuous whereby it defines an entire circle. However, the groove 34 is preferably C-shaped defining a portion of a circle.

In the embodiment illustrated in FIGS. 1-3, the rupture disk assembly 16 includes a pair of substantially annular reinforcing members 36 and 38 positioned on opposite sides of the rupture disk 26. The members 36 and 38 are identical and are positioned identically with respect to each other and the rupture disk 26. The reinforcing member 36 includes a flat annular flange portion 40 connected to an integral concave-convex hinge reinforcing member 42 which extends inwardly a short distance from the annular flat flange portion 40 thereof at one side of the concave-convex portion 30 of the rupture disk 26. That is, the concave-convex hinge reinforcing member 42 is of a peripheral shape substantially corresponding with a segment of the circle defined by the transition connection 28 of the rupture disk 16 and a chord thereof. The reinforcing member 38 includes an annular flat flange portion 44 integrally connected at one side thereof to a concave-convex hinge reinforcing member 46 identical to the hinge reinforcing member 42 of the member 36.

As mentioned above, and as best shown in FIG. 3, the groove 34 forming a line of weakness in the concave-convex portion 30 of the rupture disk 26 preferably forms a partial circle with the ends of the groove 34 terminating at the inward edges of the concave-convex hinge reinforcing members 42 and 46. The reinforcing members 36 and 38 are connected to the rupture disk 16 whereby they are rigidly held thereby. Preferably, the annular flat flange portions 40 and 44 of members 36 and 38 are spot welded to the annular flat flange portion 28 of the rupture disk 26 by a plurality of spot welds 48. In addition, the concave-convex hinge reinforcing members 42 and 46 of the members 36 and 38 are spot welded to the concave-convex portion 30 of the rupture disk 26 by a plurality of spot welds 50.

As stated above, the entire rupture disk assembly 16 including the rupture disk 26 and the members 36 and 38 attached thereto are clamped between the inlet and outlet support members 12 and 14. A pair of conventional gaskets 52 are disposed between the assembly 16 and the support members 12 and 14 for insuring a pressure-tight seal therebetween.

In operation of the apparatus 10, fluids under pressure are conducted to and exerted on the rupture disk 26 by way of the conduit 22 and the inlet support member 12. As long as the pressure of the fluids is at a level below the design rupture pressure of the rupture disk 26, the fluids under pressure are contained by the rupture disk 26. When the fluids under pressure reach a level equal to or exceeding the design rupture pressure of the rupture disk 26, the rupture disk 26 ruptures and tears along the groove 34 in the concave-convex portion 30 thereof. As shown in FIG. 2, once the rupture disk 26 has ruptured, the concave-convex portion 30 interiorly of the groove 34 is forced open by the flow of relieved fluids through the rupture disk 26. Because of the hinge reinforcing members 42 and 46 attached to the concave-convex portion 30, the torn unreinforced portion of the concave-convex portion 30 bends at the interior edges of the hinge reinforcing members 42 and 46 but remains attached thereto. Loose pieces are not formed by the rupture disk 26 upon rupture, and because of the large area of the torn portion of the concave-convex portion 30, the relieved fluids readily bend the torn portion open. Thus, in liquid or low pressure gas service wherein after rupture of the rupture disk 26, the force of relieved fluids flowing through the apparatus 10 is low, the torn portion of the rupture disk 26 is readily bent at the interior of the hinge reinforcing members 42 and 46 and maximum opening is achieved.

Referring now to FIG. 4, an alternate embodiment of the rupture disk assembly of the present invention is illustrated and generally designated by the numeral 60. The rupture disk assembly 60 includes a rupture disk 62 having an annular flat flange portion 64 connected to a concave-convex portion 66 by a circular transition connection 68. The rupture disk 62 includes a groove 70 in the concave-convex portion 66 thereof forming a substantially circular line of weakness in the concave-convex portion. Instead of a pair of annular reinforcing members, the assembly 60 includes a single annular reinforcing member 72 attached to the convex side of the rupture disk 62. The member 72 has an annular flat flange portion 74 and an integral concave-convex hinge reinforcing member 76.

Yet another embodiment of the rupture disk assembly of the present invention is illustrated in FIG. 5, generally designated by the numeral 80. The assembly 80 is similar to the assembly 60 in that it includes a rupture disk 82 having an annular flat flange portion 84 connected to a concave-convex portion 86 by a circular transition connection 88. The rupture disk 82 includes a groove or score 90 in a surface of the concave-convex portion 86 and a reinforcing member 92 is spot welded to the rupture disk 82 having an annular flat flange portion 94 and an integral concave-convex hinge reinforcing member 96. The reinforcing member 92 is attached to the concave side of the rupture disk 82.

FIG. 6 illustrates another embodiment of the rupture disk assembly of the present invention, generally designated by the numeral 100. The assembly 100 includes a rupture disk 102 having an annular flat flange portion 104 and a concave-convex portion 106 connected by a circular transition connection 108. A groove or score 110 is disposed in one side of the concave-convex portion 106 forming a substantially circular line of weakness therein and a pair of concave-convex hinge reinforcing members 112 and 114 are connected to the concave-convex portion 106 at one side thereof. The hinge reinforcing members 112 and 114 are identical in shape and function in the same manner as the hinge reinforcing members described above, except that they are separate parts which do not include flat annular flange portions. Each of the hinge reinforcing members 112 and 114 are identical in shape and are correspondingly attached to the rupture disk 102 on opposite sides thereof.

FIG. 7 illustrates another embodiment of the rupture disk assembly of the present invention, generally designated by the numeral 120. Like the other embodiments, the assembly 120 includes a rupture disk 122 having an annular flat flange portion 124 connected to a concave-convex portion 126 by a circular transition connection 128. A groove 130 is disposed in one side of the concave-convex portion 126 of the rupture disk 122 forming a substantially circular line of weakness therein and a single concave-convex hinge reinforcing member 132 which does not include an annular flange portion is attached to the convex side of the rupture disk 122.

FIG. 8 illustrates still another embodiment of the rupture disk assembly of the present invention generally designated by the numeral 140. The assembly 140 includes a rupture disk 142 having an annular flat flange portion 144 connected to a concave-convex portion 146 by a circular transition connection 148. A groove or score 150 is disposed in a side of the concave-convex portion 146 forming a substantially circular line of weakness therein and a single concave-convex hinge reinforcing member 152 which does not include an annular flange portion is attached to the concave side of the rupture disk 142.

The operation of all of the various embodiments of the rupture disk assembly of the present invention illustrated in FIGS. 4–8 is identical to the operation of the apparatus illustrated in FIGS. 1–3 and described above. In the embodiments illustrated in FIGS. 4–8, one or more concave-convex hinge reinforcing members which may or may not include annular flat flange portions are utilized. All of the concave-convex hinge reinforcing members have identical peripheral shapes corresponding to sectors of the circles defined by the transition connections of the rupture disk and chords of such circles. Whether one or two hinge reinforcing members are used as well as whether the hinge reinforcing members are integral parts of annular reinforcing members including flat flange portions depends on various factors including the particular application in which the apparatus is utilized, the thickness of the material forming the rupture disk and its resistance to bending, etc.

In order to facilitate a clear understanding of the apparatus of the present invention, the following example is given.

EXAMPLE

The apparatus 10 is connected by the conduit 22 to a pressure vessel containing liquid water at a normal operating pressure of 170 psig. The rupture disk assembly 16 includes a 3.5 inches in diameter rupture disk 26 having a 4.990 inches wide annular flat flange portion 28, i.e., the diameter of the circle defined by the transition connection 32 is 3.5 inches. The concave-convex portion 30 of the rupture disk 26 has a crown height of 0.500 inch and the rupture disk 26 is formed of 0.012 inch thick nickel. The design rupture pressure of the rupture disk 26 is 200 psig±5%. The groove 34 is 3¼ inches wide and 0.006 inch deep. The reinforcing members 36 and 38 include annular flange portions of sizes corresponding with the annular flange portion of the rupture disk 26 and concave-convex integral hinge reinforcing members 42 and 46 of a size whereby the interior edges of the hinge reinforcing members are 1.5 inches long. The greatest distance measured from the transition connection 32 of the rupture disk 26 to the interior edges of the hinge reinforcing members 42 and 46 is 0.500 inch.

When the pressure of the liquid contained within the vessel to which the apparatus 10 is connected reaches 200 psig, the rupture disk 16 ruptures and tears along the line of weakness created by the groove 34 therein. Upon rupture, the torn portion of the concave-convex portion 30 of the rupture disk 26 is bent away from the remaining portion of the rupture disk 26 along a hinge line defined by the interior edges of the hinge reinforcing members 42 and 46.

What is claimed is:

1. A rupturable pressure relief apparatus adapted to be clamped between inlet and outlet annular support members comprising:
   a rupture disk having an annular flange portion connected to a concave-convex portion by a circular transition connection, the concave-convex portion including a groove in a side thereof creating a line of weakness therein;
   at least one concave-convex hinge reinforcing member attached to a side of said concave-convex portion of said rupture disk having a shape and positioned adjacent a portion of said concave-convex portion of said rupture disk whereby upon rupture, said concave-convex portion of said rupture disk tears along said line of weakness created by said groove and bends about an integral untorn portion corresponding with said hinge reinforcing member.

2. The apparatus of claim 1 wherein said groove defines a substantially circular line of weakness in said rupture disk.

3. The apparatus of claim 2 wherein said hinge reinforcing member is of a peripheral shape substantially corresponding with a segment of the circle defined by the transition connection of said rupture disk and a chord thereof.

4. The apparatus of claim 1 wherein said hinge reinforcing member is an integral part of a substantially annular member having an annular flat flange portion positioned adjacent the annular flat flange portion of said rupture disk.

5. The apparatus of claim 1 which is further characterized to include a pair of said concave-convex hinge reinforcing members correspondingly positioned on opposite sides of said concave-convex portion of said rupture disk.

6. The apparatus of claim 5 wherein said hinge reinforcing members are of peripheral shapes substantially corresponding with a segment of the circle defined by said transition connection of said rupture disk and a chord thereof.

7. The apparatus of claim 6 wherein each of said hinge reinforcing members are integral parts of substantially annular members having annular flat flange portions positioned adjacent and on opposite sides of the annular flat flange portion of said rupture disk.

8. A rupturable pressure relief apparatus comprising:
   a pair of annular support members adapted to be sealingly clamped together and connected in a pressure relief area;
   a rupture disk having an annular flat flange portion adapted to be sealingly clamped between said annular support members connected to a concave-convex portion by a circular transition connection, the concave-convex portion including a substantially circular groove in a side thereof creating a line of weakness therein;
   at least one concave-convex hinge reinforcing member attached to a side of said concave-convex portion of said rupture disk having a shape and positioned adjacent a portion of said concave-convex portion of said rupture disk whereby upon rupture, said concave-convex portion of said rupture disk tears along said line of weakness created by said groove and bends about an integral untorn portion corresponding with said hinge reinforcing member.

9. The apparatus of claim 8 wherein said hinge reinforcing member is of a peripheral shape substantially corresponding with a segment of the circle defined by said transition connection of said rupture disk and a chord thereof.

10. The apparatus of claim 9 wherein said hinge reinforcing member is an integral part of a substantially annular member having an annular flat flange portion positioned adjacent the annular flat flange portion of said rupture disk.

11. The apparatus of claim 8 which is further characterized to include a pair of said concave-convex hinge reinforcing members correspondingly positioned on opposite sides of said concave-convex portion of said rupture disk.

12. The apparatus of claim 11 wherein said hinge reinforcing members are of peripheral shapes substantially corresponding with a segment of the circle defined by said transition connection of said rupture disk and chords thereof.

13. The apparatus of claim 12 wherein each of said hinge reinforcing members are integral parts of substantially annular members having annular flat flange portions positioned adjacent the annular flat flange portion of said rupture disk on opposite sides thereof.

14. The apparatus of claim 13 wherein said annular members including said hinge reinforcing members and said rupture disk are spot welded together.

* * * * *